United States Patent
Becker et al.

(10) Patent No.: US 7,290,957 B2
(45) Date of Patent: Nov. 6, 2007

(54) LASER WELDING SEAM WITH REDUCED END-CRATER AND PROCESS FOR PRODUCTION THEREOF

(75) Inventors: Wolfgang Becker, Ulm (DE); Jens Bühler, Stuttgart (DE); Tilman Froschmeier, Ammerbuch (DE); Klaus Goth, Sindelfingen (DE); Markus Knöller, Nagold (DE); Claus-Deiter Reiniger, Remshalden (DE); Daniel Zauner, Ballendorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/344,809

(22) Filed: Feb. 1, 2006

(65) Prior Publication Data

US 2006/0222457 A1    Oct. 5, 2006

(30) Foreign Application Priority Data

Feb. 1, 2005    (DE) ..................... 10 2005 004 787

(51) Int. Cl.
*B23K 26/28* (2006.01)

(52) U.S. Cl. .................................. 403/270; 219/121.64

(58) Field of Classification Search ........... 219/121.63, 219/121.64, 121.8; 403/270, 271; 148/525
See application file for complete search history.

(56) References Cited

U.S. PATENT DOCUMENTS

| | | | | |
|---|---|---|---|---|
| 3,686,465 A | * | 8/1972 | Urbanic | 219/137.71 |
| 7,091,444 B2 | * | 8/2006 | Becker et al. | 219/121.64 |
| 2006/0163221 A1 | * | 7/2006 | Makase et al. | 219/121.64 |

FOREIGN PATENT DOCUMENTS

| | | | | |
|---|---|---|---|---|
| DE | 196 27 913 A1 | | 2/1997 | |
| DE | 101 62 452 A1 | | 7/2003 | |
| JP | 62-110885 A | * | 5/1987 | 219/121.64 |
| JP | 2003 145 285 A | | 5/2003 | |
| JP | 2003-290951 A | | 10/2003 | |
| JP | 2004-98122 A | * | 4/2004 | |

* cited by examiner

*Primary Examiner*—Geoffrey S. Evans
(74) *Attorney, Agent, or Firm*—Akerman Senterfitt; Stephen A. Pendorf; Yonghong Chen

(57) ABSTRACT

A laser weld seam with reduced end crater and a process for production thereof are provided. The seam end is provided at a location, which exhibits a excessive material relative to the surrounding surface or thereby, that the seam towards the seam end exhibits a counter-running direction change of its preferred direction, which is designed in such a manner, that as a consequence of the interaction between cooling forward and counter-running seam a backfill of the melt towards the seam end occurs.

11 Claims, 1 Drawing Sheet

LASER WELDING SEAM WITH REDUCED END-CRATER AND PROCESS FOR PRODUCTION THEREOF

CROSS REFERENCE TO RELATED APPLICATION

This application claims the benefit of German Application No. DE 10 2005 004 787.4-34 filed Feb. 1, 2005.

BACKGROUND OF THE INVENTION

1. Field of Invention

The invention concerns a process for laser beam welding with reduced formation of end craters.

During laser beam welding a so-called end crater forms at the end of the weld seam. The end crater is formed by the volume shrinkage of the solidifying melt after the laser beam reaches the seam end and is switched off or repositioned. The end crater acts as a geometric notch or groove and degrades the mechanical properties, and in particular the operational stability, of the weld seam, so that holes or tears in the area of the end crater can occur.

2. Related Art of the Invention

For reducing the formation of end craters, it is taught in DE 196 30 521 A1 to reduce the laser output at the seam end (so-called "power ramp") or to increase the weld speed (so-called "speed ramp").

Similar methods involving reducing the laser power or defocusing the laser beam are disclosed in DE 102 29 744 A1, JP 551 14 490 A and JP 602 16 987 A.

These procedures reduce the problem slightly, but generally not adequately.

The task the present invention is thus comprised therein, of providing a laser weld seam with reduced end craters and a process for production thereof.

SUMMARY OF THE INVENTION

The task is solved thereby, that the seam end is provided at a location, which exhibits an excessive material relative to the surrounding surface or thereby, that the seam towards the seam end exhibits a counter-running direction change of its preferred direction, which is designed in such a manner, that as a consequence of the interaction between cooling forward and counter-running seam a backfill of the melt towards the seam end occurs.

BRIEF DESCRIPTION OF THE DRAWING

The FIGURE shows a second illustrative embodiment in which a laser beam is guided towards the seam end along a rounded beam guide curve with small weld seam radius.

DETAILED DESCRIPTION OF THE INVENTION

Figure 1:
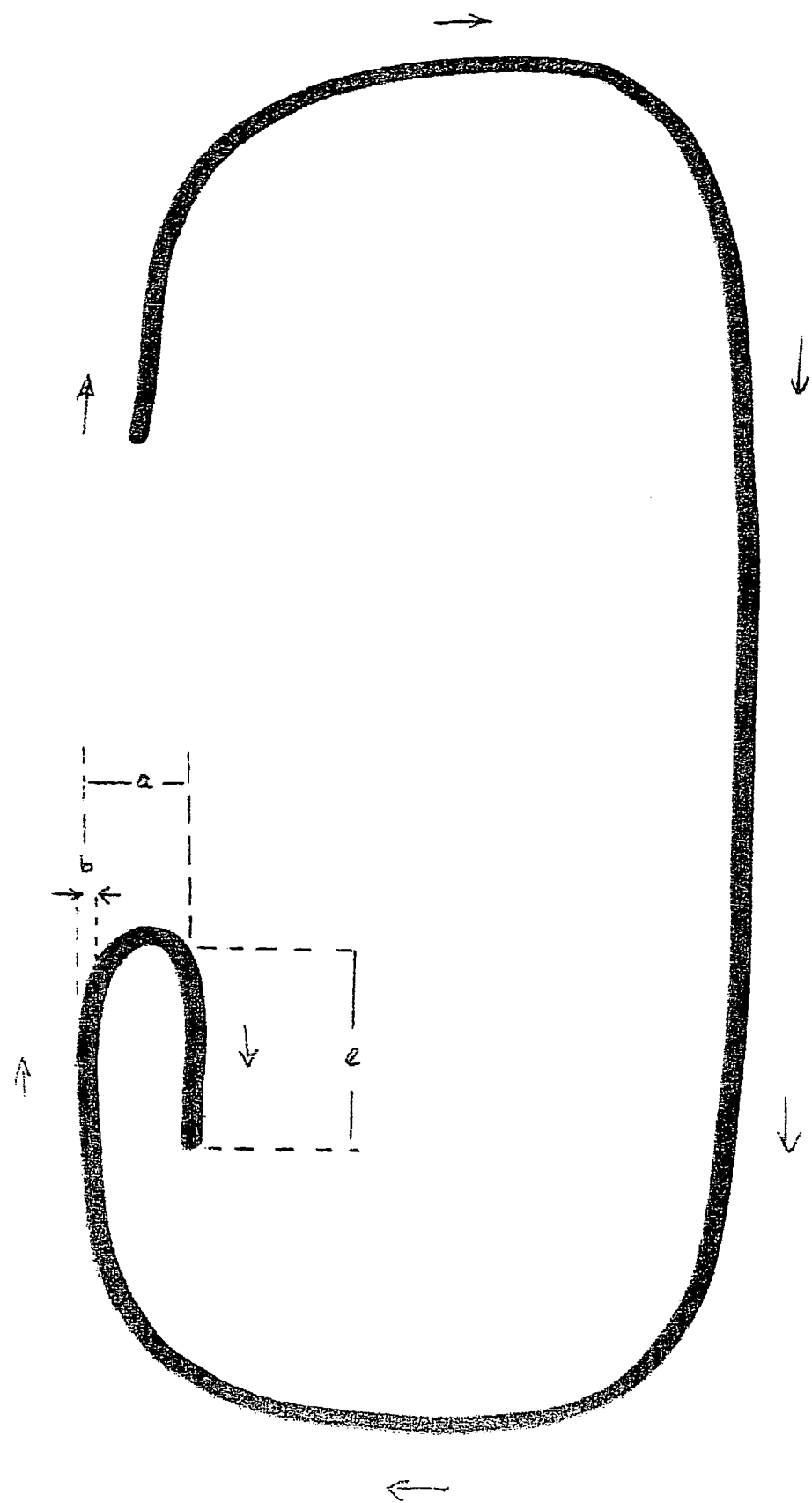

With regard to the laser weld seam to be provided, the task is inventively solved thereby, that the seam end is positioned at a location, which has an excess of material relative to the surrounding surface.

The excess material is likewise melted by the welding laser beam and fills in the crater formed at the seam end as a consequence of volumetric shrinkage of the produced melt and thereby substantially reduces this or as the case may be in the ideal case eliminates it completely.

In one preferred embodiment the material excess is formed as a local topographic change projecting from the surface.

One such topographic change projecting from the surface can be produced for example according to DE 10 241 593 A1, in which the laser beam describes a decreasing spiral about its processing surface. One such topographic change can be produced independent of the laser weld seam or also during the production thereof.

A further possibility for producing a topographic change projecting from the surface is by stamping or beading or crimping of the sheet metal to be welded.

A topographic change projecting from the surface is likewise formed at the beginning of a laser weld seam.

A further solution to the task with regard to the laser weld seam to be produced is provided inventively thereby, that the seam describes, towards the seam end, a counter-oriented direction change of its preferred direction, which is designed in such a manner, that as a consequence of the interaction between cooled forward-running and counter-running seams, a replenishing back-flow of melt occurs towards the seam end.

One such interaction comes into play for example when the separation between forward and return running seam does not exceed the five-fold of the weld seam breadth. It is particularly pronounced when the separation does not exceed the three-fold of the weld seam breadth.

Particularly advantageous for the reduction of end crater formation is the length of the counter-running seam, which should represent at least the three-fold of the weld seam breadth, preferably at least the five-fold, however preferably not exceed the ten-fold.

The task with regard to the process to be provided for production of a laser weld seam with reduced end crater formation in accordance with the invention is solved thereby, that the seam end is positioned at a location which exhibits a material excess.

In the production of the weld seam, the excess material is likewise melted by the welding laser beam, and fills the end crater formed at the seam end as a consequence of the volumetric shrinkage of the produced melt, and thereby substantially reduces the crater formation, and in certain cases eliminates this—in the ideal case—completely.

In a preferred embodiment, the material excess is in the form of a local topographic change projecting from the surface.

One such topographic change projecting from the surface can be produced as described above.

A further solution of the task with regard to the process to be provided is inventively provided thereby, that the laser beam is guided, towards the end of the seam, in such a manner, that the resulting weld seam experiences a counter-running direction change of its preferred or primary direction, so that it is a consequence of the interaction between cooled forward running seam and the counter-running seam a backfill of the melt occurs towards the seam end.

In a preferred embodiment of this process the laser weld seam is so guided towards the seam that the distance between forward-running and counter-running seam does not exceed the five-fold of the seam breadth, preferably the three-fold.

It is particularly preferred when the laser beam is guided towards the seam end in such a manner that the length of the counter-running seam represents at least the three-fold of the seam breadth, preferably the five-fold, however preferably does not exceed the ten-fold.

It is likewise advantageous to combine the above-described processes for production of a laser weld seam with reduced end crater with the known processes for reducing the laser power, increasing the weld speed and/or defocusing.

When using the presently described processes, suitable solidification zones at the seam end are produced during welding of the steel sheet metal of the type employed conventionally in automobile construction.

The inventive process is however likewise suited for welding of other metals or also plastics.

In the following the inventive laser weld seam and the inventive process for the production thereof is described in greater detail on the basis of two illustrative embodiments and the FIGURE:

In a first illustrative example the topographic changes projecting from the surface are produced in the steel sheet metal at a precalculated position at which the weld seam end is to later lie. For this, the sheet metal is oriented, and a scanner device is passed evenly thereover and directs a laser beam over the processing surface. The scanner device is comprised of a three-dimensional pivotable computer controlled mirror system. The scanner device is spaced approximately 300 mm from the surface of the sheet metal and the laser focus is upon the surface to be welded. For producing a topographic change projecting from the surface the laser beam is so guided that it describes a spiral with a maximal diameter of 3 mm and narrowing about the center of its processing surface. The laser output comprises 1,700 Watt, the weld speed 15 m/s.

After producing the topographic change projecting from the surface the laser beam is again guided over the surface, in order now to so-pull the weld seam, that its ends lie upon the topographic changes. The laser output comprises 1,700 Watt, the weld speed 15 m/s. During welding over the area of the topographic changes the excess material projecting from the surface is likewise melted by the welding laser beam and fills the end crater formed at the seam end as a consequence of volumetric shrinkage of the produced melt and thereby substantially reduces end crater formation.

In a second illustrative embodiment, according to the FIGURE which is schematic and not to scale (the laser beam having the above-recited parameters) is guided towards the seam end along a rounded beam guide curve with small weld seam radius in such a manner, that the resulting weld seam experiences a counter-running direction change relative to its preferred direction. By the heat accumulation as a consequence of the change in direction between cooling forward-running and counter-running weld seam, the cooling time of the weld seam is increased and a backflow of the melt towards the weld seam end is enabled, whereby end crater formation is reduced.

For this the laser beam is guided in such a manner (the arrows in the FIGURE indicate the direction of movement), that the space a between advance and counter-running seam describes a breadth b which is the five-fold of the seam breadth and the length l of the counter-running seam is the ten-fold of the seam breadth b.

The inventive laser weld seam and the inventive process have demonstrated themselves in the illustrative embodiments of the above-described examples as particularly suited for laser welding of steel sheet metal in the automobile industry.

In particular, a significant reduction in end crater formation can be achieved thereby, whereby the mechanical characteristics of the weld seam are significantly improved.

By the utilization of a laser scanner supplemental substantial advantages can be achieved with regard to the processing time and precision.

The invention is not limited to the above-described illustrated embodiments, but rather can be broadly applied.

The type of material excess, in particular the type of the introduction of topographic change, is not strictly limited to the above-described limitations and illustrative embodiments, but rather can be adapted depending upon application and on the basis of the know-how of the person of ordinary skill in the art, for example adapting to the material to be welded.

The same applies for the mode, dimension and measurements of the counter-running direction change which, instead of the rounded-off beam guidance curve represented as an example, can also run along a angled, particularly sharp angled, beam guidance curve.

The invention claimed is:

1. A laser weld seam with reduced end crater, produced by
   determining the location on a surface at which the seam is to end,
   welding the seam with a laser beam in a forward direction,
   changing the direction of the laser beam to run in the counter-direction, such that as a consequence of the interaction between cooling melt from the seam produced in the forward direction and melt from the counter-running seam, a backfill of the melt towards the seam end occurs.

2. A laser weld seam according to claim 1, wherein the space between the forward-running and counter-running seam does not exceed the five-fold of the seam breadth.

3. A laser weld seam according to claim 1, wherein the space between the forward-running and counter-running seam does not exceed the three-fold of the seam breadth.

4. A laser weld seam according to claim 1, wherein the length of the counter-running seam is at least the three-fold of the seam breadth.

5. A laser weld seam according to claim 1, wherein the length of the counter-running seam is at least the five-fold of the seam breadth.

6. A process for producing a laser weld seam with reduced end crater, said process comprising:
   determining the location on a surface at which the seam is to end,
   providing excess material projecting above the surface to be welded at the location at which the seam is to end, and
   welding the seam with a laser beam, ending at the predetermined location, such that excess material is melted by the laser beam and at least in part fills the end crater;
   wherein a local topographic change projecting from the surface is produced prior to reaching the seam end.

7. A process for producing a laser weld seam with reduced end crater, said process comprising:
   determining the location on a surface at which the seam is to end,
   welding the seam with a laser beam in a forward direction,
   changing the direction of the laser beam to run in the counter-direction, such that as a consequence of the interaction between cooling melt from the seam produced in the forward direction and melt from the counter-running seam, a backfill of the melt towards the seam end occurs.

8. A process according to claim 7, wherein towards the seam end the laser beam is guided in such a manner that the distance between forward-running and counter-running seam does not exceed the five-fold of the seam breadth.

9. A process according to claim 7, wherein towards the seam end the laser beam is guided in such a manner that the distance between forward-running and counter-running seam does not exceed the three-fold of the seam breadth.

10. A process according to claim 7, wherein towards the seam end the laser beam is guided in such a manner that the length of the counter-running seam represents at least the three-fold of the seam breadth.

11. A process according to claim 7, wherein towards the seam end the laser beam is guided in such a manner that the length of the counter-running seam represents at least the five-fold of the seam breadth.

\* \* \* \* \*